United States Patent
Bencze et al.

(10) Patent No.: US 10,638,584 B2
(45) Date of Patent: Apr. 28, 2020

(54) SYSTEM AND METHOD FOR COMMUNICATING BETWEEN NON-NETWORKED MONITORING DEVICE AND NETWORKED LIGHTING CONTROLLERS

(71) Applicant: CURRENT LIGHTING SOLUTIONS, LLC, East Cleveland, OH (US)

(72) Inventors: Balazs Bencze, Budapest (HU); Gabor Szabo, Budapest (HU); Gergely Katz, Budapest (HU); Tamas Istvan Vegh, Budapest (HU); Sandor Polyak, Budapest (HU)

(73) Assignee: CURRENT LIGHTING SOLUTIONS, LLC, East Cleveland, OH (US)

( * ) Notice: Subject to any disclaimer, the term of this patent is extended or adjusted under 35 U.S.C. 154(b) by 0 days.

(21) Appl. No.: 15/961,438

(22) Filed: Apr. 24, 2018

(65) Prior Publication Data
US 2019/0327819 A1 Oct. 24, 2019

(51) Int. Cl.
*H05B 47/19* (2020.01)
*H04W 4/06* (2009.01)

(52) U.S. Cl.
CPC .............. *H05B 47/19* (2020.01); *H04W 4/06* (2013.01)

(58) Field of Classification Search
CPC ............ H05B 37/0272; H05B 37/0227; H05B 33/0815; H05B 47/19; H04W 4/06
See application file for complete search history.

(56) References Cited

U.S. PATENT DOCUMENTS

| | | | |
|---|---|---|---|
| 5,109,384 | A | 4/1992 | Tseung |
| 5,117,430 | A | 5/1992 | Berglund |
| 5,167,035 | A | 11/1992 | Mann et al. |
| 6,363,416 | B1 | 3/2002 | Naeimi et al. |
| 8,976,704 | B2 | 3/2015 | Morper |

(Continued)

FOREIGN PATENT DOCUMENTS

WO 2017/223067 A1 12/2017

OTHER PUBLICATIONS

Samir Patel, EIC 2800 Search Report, Dec. 4, 2019, Scientific and Technical Information Center (Year: 2019).*

(Continued)

*Primary Examiner* — Raymond R Chai
(74) *Attorney, Agent, or Firm* — Buckley, Maschoff & Talwalkar LLC

(57) ABSTRACT

A lighting control system includes a monitoring assembly comprising a switch, an energy harvesting device, and radio circuitry. The switch is manually actuated to activate or deactivate network-controlled lamps. The energy harvesting device converts kinetic energy of the actuation of the switch into electric energy that powers the radio circuitry. The radio circuitry wirelessly broadcasts a radio control message to two or more networked controllers that control activation or deactivation of the lamps. The networked controllers communicate with each other and determine which of the networked controllers is a commander controller responsive to receiving the radio control message. The commander controller communicates a control message to other networked controllers to activate or deactivate the lamps based on the radio control message received from the monitoring assembly.

22 Claims, 5 Drawing Sheets

(56) References Cited

U.S. PATENT DOCUMENTS

| | | | | |
|---|---|---|---|---|
| 2010/0296285 | A1* | 11/2010 | Chemel | H05B 33/08 362/235 |
| 2010/0332605 | A1* | 12/2010 | Hutchison | H04L 67/2814 709/206 |
| 2012/0039177 | A1 | 2/2012 | Kubisch et al. | |
| 2012/0299509 | A1 | 11/2012 | Lee et al. | |
| 2014/0022061 | A1* | 1/2014 | Apte | H05B 47/19 340/12.5 |
| 2014/0022917 | A1* | 1/2014 | Apte | H04L 12/2803 370/252 |
| 2014/0075087 | A1* | 3/2014 | Bartling | G06F 11/1032 711/102 |
| 2014/0293276 | A1* | 10/2014 | Hughes | H05B 47/11 356/222 |
| 2016/0366751 | A1 | 12/2016 | Xu et al. | |
| 2017/0012719 | A1 | 1/2017 | Skaaksrud et al. | |
| 2017/0012720 | A1 | 1/2017 | Skaaksrud et al. | |
| 2018/0066833 | A1 | 3/2018 | Draaijer et al. | |
| 2018/0084317 | A1 | 3/2018 | McCleland et al. | |
| 2018/0139065 | A1* | 5/2018 | Chan | H04L 12/10 |

OTHER PUBLICATIONS

International Search Report and Written Opinion issued in connection with corresponding PCT Application No. PCT/US2019/028855 dated Sep. 6, 2019.

* cited by examiner

US 10,638,584 B2

SYSTEM AND METHOD FOR COMMUNICATING BETWEEN NON-NETWORKED MONITORING DEVICE AND NETWORKED LIGHTING CONTROLLERS

BACKGROUND

Various systems can be controlled by networked devices. For example, some lighting systems include lamps that are controlled by networked controllers that communicate with each other to coordinate the activation and deactivation of the lamps. Some of these networked lighting systems can provide for automated control of the lamps.

At times, however, the automated control of the lamps may need to be manually overridden. For example, a user may wish to deactivate the lamps by actuating a tangible device, such as by flipping a switch, pressing a button, etc. These actuated devices may be part of the network of controllers in that the actuated devices may be connected with the networked controllers by wired and/or wireless connections.

The actuated devices may require a power source, such as an internal battery. The battery may need occasional replacing, but the timely replacing of the batteries may be forgotten due to the infrequent nature in which the batteries need to be replaced. As a result, the ability to manually override the automated control of the lamps may be lost.

While energy harvesting devices exist that can power other devices using ambient energy, the inclusion of energy harvesting devices into a networked system can pose problems. For example, many networks (such as lighting control networks) may require or involve repeated communications with the components connected in the networks. Use of energy harvesting devices to power networked components can result in the networked components being unable to communicate with the energy harvested-powered devices during time periods where there is insufficient ambient energy to harvest for power. As a result, the networked controllers may be unable to communicated with the energy harvested-powered devices, and operation of the network may suffer.

BRIEF DESCRIPTION

In one embodiment, a lighting control system includes a monitoring assembly comprising a switch, an energy harvesting device, and radio circuitry. The switch is configured to be manually actuated to activate or deactivate one or more network-controlled lamps. The energy harvesting device is configured to convert kinetic energy of the manual actuation of the switch into electric energy that powers the radio circuitry. The radio circuitry is configured to wirelessly broadcast a radio control message. The system also includes two or more networked controllers configured to control activation or deactivation of the one or more network-controlled lamps. The two or more networked controllers are configured to wirelessly receive the radio control message from the monitoring assembly. The two or more networked controllers also are configured to communicate with each other and determine which of the two or more networked controllers is designated as a commander controller responsive to receiving the radio control message. The commander controller is configured to communicate the radio control message or another control message to one or more other networked controllers to activate or deactivate the one or more network-controlled lamps based on the radio control message received from the monitoring assembly.

In one embodiment, a method includes detecting an event at a monitoring assembly, broadcasting a detection message from the monitoring assembly, receiving the detection message at two or more nodes in a network, arbitrating which of the two or more nodes in the network is a commander node among the two or more nodes in the network, and communicating the detection message or another message representative of the event from the commander node to other nodes in the network responsive to arbitrating which of the two or more nodes is the commander node.

In one embodiment, a system includes a monitoring assembly configured to detect an event within a monitored area of the device. The monitoring assembly is configured to broadcast a detection message toward a network. The system also includes two or more nodes of the network configured to receive the detection message and to arbitrate which of the two or more nodes in the network is a commander node among the two or more nodes in the network. The commander node is configured to communicate the detection message or another message representative of the event to other nodes in the network responsive to arbitrating which of the two or more nodes is the commander node.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
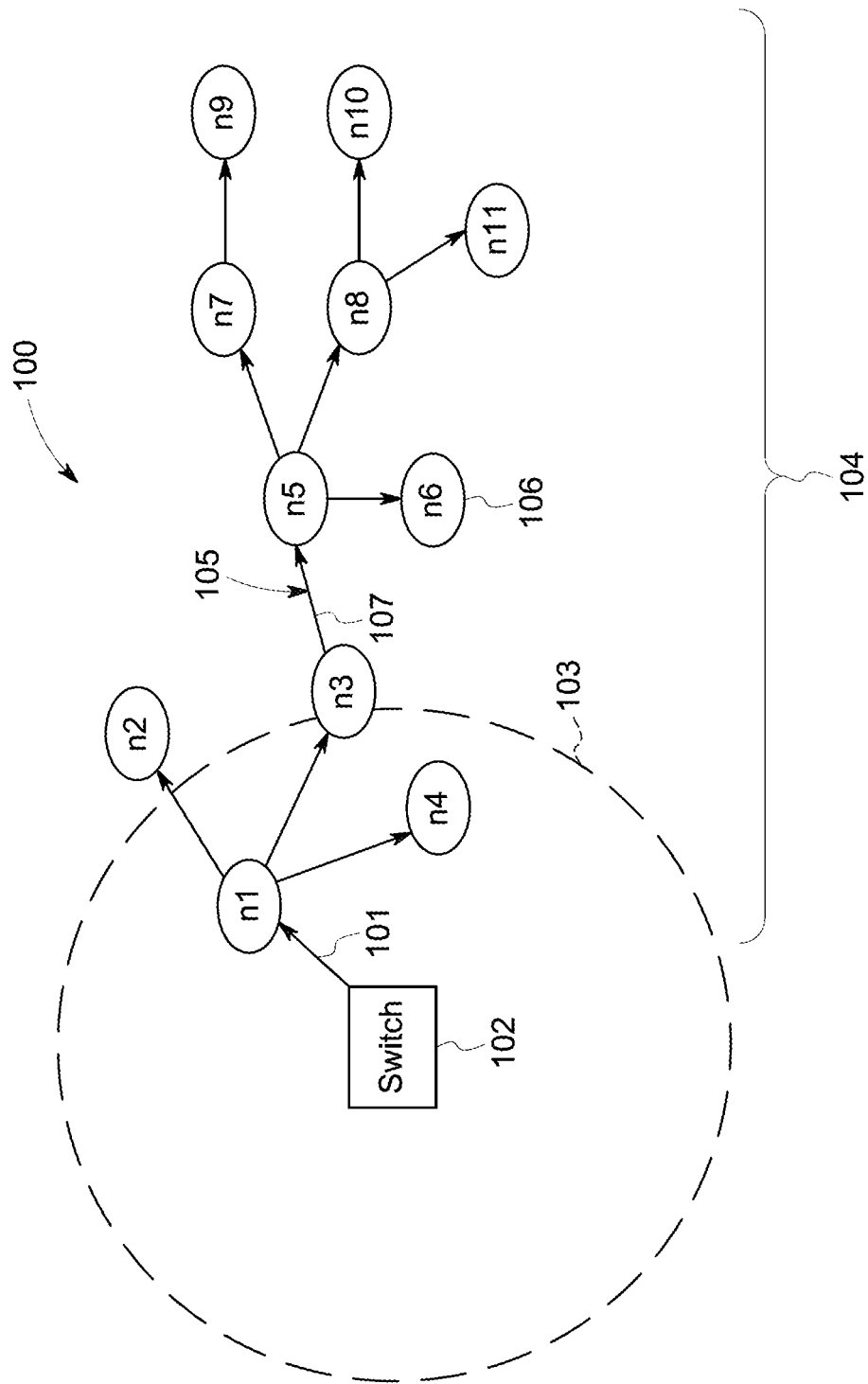
FIG. 1 illustrates one embodiment of a communication system.

The inventive subject matter described herein relates to systems and methods that permit and/or control communications between non-networked monitoring devices and networked controllers, such as controllers that control operation of lamps (e.g., lighting devices). While examples of the inventive subject matter described herein are directed to the control of lamps in a networked lighting control system, not all embodiments of the inventive subject matter are limited to lamps or lighting control systems. Instead, one or more embodiments of the inventive subject matter can relate to communication with other types of networks and/or communication used for purposes other than controlling lamps.

One embodiment of the inventive subject matter relates to communication between a monitoring assembly and one or more networks of controllers. The monitoring assembly can determine when an event occurs, such as actuation of a switch or button of the monitoring assembly, movement within a field of view or monitored area of the assembly, a change in an amount or level of light in the field of view or monitored area of the assembly, or the like. The monitoring assembly may not be a part of a control network (e.g., a lighting control network), such as a mesh network, but may broadcast a signal for receipt by one or more node devices of the control network. Optionally, the signal may be broadcast for receipt by node devices in multiple, different control networks. The signal can be wirelessly broadcast, such as by sending the signal as a radio message.

Because the monitoring assembly may not be a part of the control network(s), the monitoring assembly may not communicate the signal in the same format or protocol that is used within the network(s) for communication between or among node devices in the network(s). For example, the signal may be broadcast by the monitoring assembly as a radio signal, while the node devices in the network communicate with each other using signals dictated by one or more of the IEEE standards, such as one or more of the IEEE 802.15.4 standards.

For example, a user can flip a switch at the monitoring assembly to manually turn off or on lamps (or to effectuate some other manual change). This action can be used by a power harvesting device of the monitoring assembly to convert at least some of the kinetic energy of flipping the switch into electric energy that powers one or more components of the monitoring assembly. Radio circuitry of the monitoring assembly can wirelessly broadcast an event packet or event signal that is captured by two or more node devices in a network. The event packet or event signal that is broadcast is sent in a dispersed manner for receipt by many devices, as opposed to a transmitted packet or signal. A transmitted packet or signal may be sent to a single recipient or certain identified recipients. In contrast, a broadcast packet or signal is communicated without being addressed or directed to any particular recipient.

The event signal is received by the node devices in a network. One of these node devices may be assigned a commander role, and can be referred to as a commander node. This commander node can obtain the event signal from the monitoring assembly (and, optionally, can obtain additional signals from the monitoring assembly), optionally authenticates the event signal or signals, and communicates (e.g., broadcasts and/or transmits) the event signal or signals to other node devices in the same network as the commander node. The commander node can authenticate the event signal received from the monitoring assembly based on identifying information included in the event signal, such as a unique identifier of the monitoring assembly. The commander node can then send a command signal to other node devices in the same network as the commander node.

As described in more detail below, the monitoring assembly may broadcast the same event signal to node devices in multiple networks. A different commander node in each of these networks can receive the event signal and send a command signal to the node devices in the same network as the commander node, but not to any nodes in another network.

The command signal sent by the commander node is received by the other node devices in the network, and can direct one or more (or all) of the other node devices to implement one or more responsive actions. These actions can include automatically activating (e.g., turning on) a lamp or other light-generating device, automatically deactivating (e.g., turning off) the lamp or light-generating device, automatically changing a light output of the lamp or light-generating device (e.g., dimming or brightening the light), automatically changing a color of light output of the lamp or light-generating device, etc. Optionally, the responsive actions can include actions other than changing the light from a lamp, such as (and without limitation) automatically opening or closing a door or window, changing a setting of a thermostat, changing a volume of a speaker, locking or unlocking a door or window, or the like.

The commander node can be selected among several node devices based on expiration of one or more time limits. The event signal from the monitoring assembly can be received by several node devices. These node devices wait for a designated period of time (e.g., five hundred milliseconds, or a different non-zero or non-instantaneous amount of time) following receipt of the event signal. If no command signal is received from a commander node before expiration of the designated period of time, then one of the node devices that received the event signal can be assigned or promoted to operate as the commander node. The promotion of a node device to the commander node for the network can be sent to the other node devices in the same network in a promotion signal.

In one embodiment, a node device is promoted to or selected as the commander node by the node devices (that receive the event signal from the monitoring assembly) comparing identifying information associated with the node devices. The node devices can compare unique network addresses assigned to the node devices and select the commander node based on the network addresses (e.g., by selecting the node device with the numerically smallest network address or the node device with the largest network address). As another example, the node devices can compare priority values assigned to the node devices and select the commander node based on the priority values. Or, the node devices can compare other unique information assigned to the node devices (such as serial numbers) and select the commander node based on the unique information. Alternatively, the commander node can be selected in another manner.

The node device selected as the commander node can remain as the commander node for one or more additional signals communicated to and/or within the network. This node device can remain as the commander node unless or until another node device is promoted to commander node, as described herein.

The systems and methods described herein can ensure that at least one node device is available to receive and communicate commands to other networked node devices responsive to receipt of an event signal sent by a monitoring assembly that is not included in the network. The monitoring assembly may be a stand-alone device that does not communicate using the same message protocols or formats as the node devices, but instead broadcasts signals that are received by node devices. The node devices determine which node device is the commander node, and can adaptively change which node device is the commander device.

In one embodiment, the node devices are connected in a mesh network, while the monitoring assembly is not connected in the network. Devices can be connected in a network (mesh or otherwise) when the devices have known or previously designated communication pathways between the devices. Because the monitoring assembly may not communicate signals using the same format or protocols as the node devices (but instead can broadcast signals), the monitoring assembly is not communicatively coupled with the node devices and/or does not have a known or previously designated communication pathway with any of the node devices.

At least one technical effect of the inventive subject matter described herein is the allowance for use of a larger variety of types of monitoring devices to communicate with a mesh network than is currently available, and for the use of energy harvesting devices to be used to power the components of the monitoring assembly. As one example, the monitoring assembly may communicate using the ZigBee specification while the node devices can communicate using the Thread mesh networking technology. The communications between the monitoring assembly and the networks, and the communications within the networks, can allow for multiple different protocol stacks to be used in the communications while ensuring that the event signals are successful communicated from the monitoring assembly to one or more networks.

Figure 2:
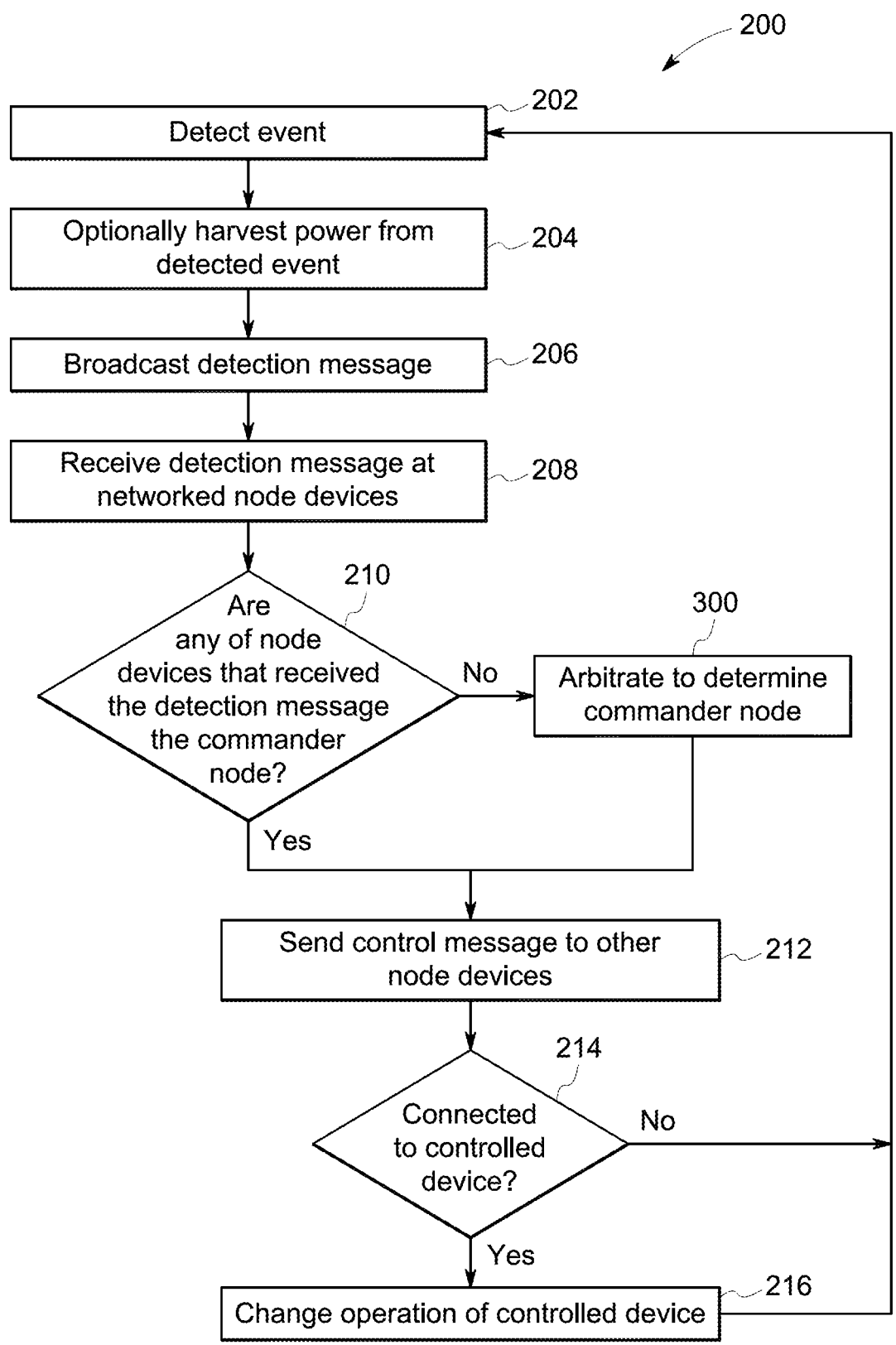
FIG. 2 illustrates a flowchart of one embodiment of a method for communicating between a non-networked monitoring assembly and a network of node devices.

FIG. 1 illustrates one embodiment of a communication system 100. FIG. 2 illustrates a flowchart of one embodiment of a method 200 for communicating between a non-networked monitoring assembly 102 and a network 104 of node devices 106. The method 200 can represent operations performed by the various components of the system 100, as described herein. The communication system 100 allows for communication between the non-networked monitoring assembly 102 ("Switch" in FIG. 1) with the network 104 of node devices 106 ("n1," "n2," "n3," and so on, in FIG. 1).

At 202, an event is detected. The monitoring assembly 102 can detect an event at or within a monitored area. The monitoring assembly 102 can include one or more components that detect when a switch is actuated, when a button is pressed, when a lever is moved, when an object moves within a field of view of the monitoring assembly 102, when a light level changes, or the like.

At 204, power is optionally harvested from the detected event. As described in more detail below, the monitoring assembly 102 can include a power harvesting device that converts at least part of the ambient or kinetic energy involved in or around the event that is detected. This energy can be converted into electric energy (e.g., current) that powers one or more components of the monitoring assembly 102. For example, the monitoring assembly 102 can be a passive device that does not have a power source such as a battery, connection to utility grid, or the like. The monitoring assembly 102 can include the power harvesting device that converts the kinetic energy of the flipping of a switch into current that powers the monitoring assembly 102, that converts vibrations detected during movement near the monitoring assembly 102 into current that powers the monitoring assembly 102, that converts light near the monitoring assembly 102 into current that powers the monitoring assembly 102, or the like. Alternatively, the method 200 does not include the operation described in connection with 204.

At 206, a detection message is broadcast. The monitoring assembly 102 can broadcast a detection message or signal 101 that indicates that the event was detected. For example, the broadcasting of the detection message 101 can indicate that the switch, button, or lever was moved, that movement was detected, that a light level changed, or the like.

The detection message 101 can be broadcast by the monitoring assembly 102 wirelessly communicating the detection message 101 to devices that are within a broadcasting range 103 of the monitoring assembly 102. For example, the monitoring assembly 102 can send the detection message 101 as or in a radio signal that is able to be sensed within the range 103 of the monitoring assembly 102. The detection message 101 is broadcast by the monitoring assembly 102 in that the detection message 101 is not transmitted or addressed to any particular or selected device, but is instead communicated to any device that is within the range 103 of the monitoring assembly 102 and that has the hardware that is operational to receive the detection message 101.

At 208, the detection message is received by node devices in the network. In the illustrated example, the detection message 101 is wirelessly broadcast by the monitoring assembly 102 and received by two of the three node devices 106, specifically node n1 and node n4. These are the only node devices 106 within the range 103 of the monitoring assembly 102. Alternatively, more or fewer node devices 106 may receive the detection message 101.

The node devices 106 in the network 104 are coupled with each other by wired and/or wireless communication links 105. These communication links 105 can be known or designated connections between the node devices 106 that permit communication of data signals between and/or among the node devices 106 using a defined protocol and/or format.

The monitoring assembly 102 is not included in the network 104, and may not be capable of communicating using the format and/or protocols used by the node devices 106 in the network 104. As a result, the monitoring assembly 102 may be limited to broadcasting the detection message 101 to any node devices 106 that can receive the detection message 101, but is not able to transmit other data signals to the node devices 106 and/or is incapable of receiving and understanding (e.g., acting on) any message sent by any node device 106. For example, no communication link 105 may exist between the monitoring assembly 102 and any node device 106 so that the monitoring assembly 102 cannot communicate and is incapable of communicating other messages (e.g., command messages and/or promotion messages) to, from, or between the node devices 106.

At 210, a determination is made as to whether any of the node devices that received the detection message is a commander node of the network. If one of the node devices n1, n4 that receives the detection message 101 is identified or previously selected as a commander node of the network 104 (e.g., node device n1), then flow of the method 200 can proceed toward 212, where that node device n1 can generate and send a command message or signal 107 along, through, or via the communication links 105 to one or more other node devices 106. As shown in FIG. 1, the node devices 106 can relay the command message 107 through or between the node devices 106 to ensure that many (or all) node devices 106 in the network 104 receive the command message 107. The command message 107 may include information that identifies the commander node that sent the command message 107, even if the command message 107 was sent to the node device 106 from the commander node via or through another node device 106.

But, if the node devices that received the detection message are not a commander node of the network, then flow of the method 200 can proceed from 210 toward 300. At 300, the node devices that received the detection message arbitrate among themselves to determine which of these node devices is to be the commander node. These node devices can compare identifying information associated with each other to determine which of the node devices is to be selected as (e.g., promoted to the role of) the commander node. In one embodiment, only those node devices 106 that received the detection message 101 broadcast from the monitoring assembly 102 arbitrate among themselves to determine which of those node devices 106 is promoted to the commander node.

Figure 3:
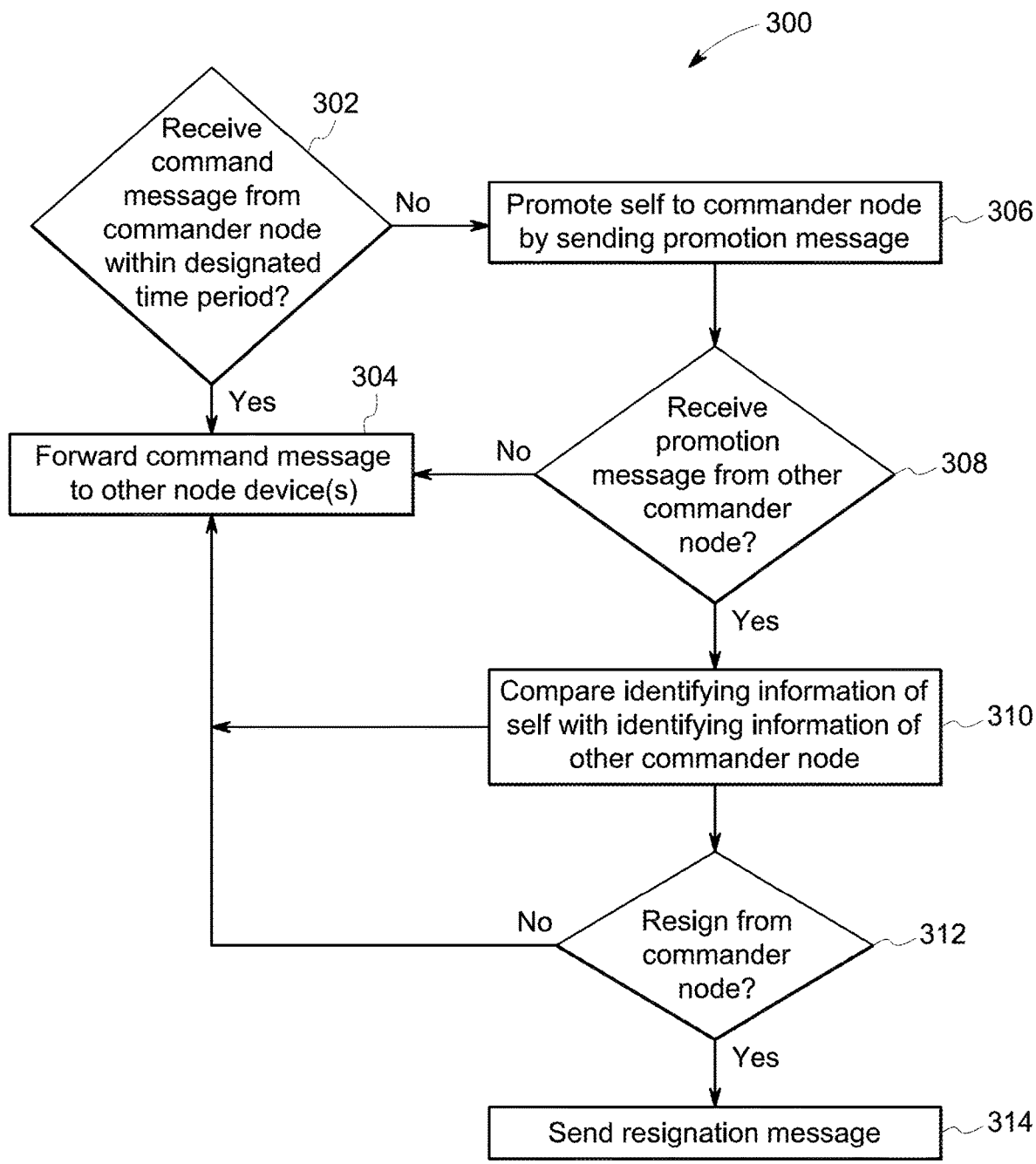
FIG. 3 illustrates a flowchart of one embodiment of a method for arbitrating between node devices to determine which node devices is a commander node of a network.

The node devices 106 can arbitrate among themselves to determine which node device 106 is to operate as the commander node in the event that the commander node did not receive the detection signal and/or in the event that no node device 106 is identified as the commander node. With continued reference to the flowchart of the method 200 shown in FIG. 2, FIG. 3 illustrates a flowchart of one embodiment of a method 300 for arbitrating between node devices to determine which node devices is a commander node of a network. The method 300 can represent operations performed by each, or at least one, of the node devices 106 to determine which of several node devices 106 is to be the only commander node for the network 104 in one example. For example, one or more of the operations performed in connection with the operation at 300 in the method 200 can be illustrated and described in connection with the method 300 shown in FIG. 3 in one embodiment.

At 302, a determination is made as to whether a command message is received at the node device. For example, the node device 106 can determine whether a command message 107 has been received within a designated time limit. This designated time limit can be defined by a user of the system 100, such as 500 milliseconds or another period of time. If a command message has been recently received by the node device 106, then a commander node may already be identified. As a result, flow of the method 300 can flow toward 304.

At 304, the command message received by the node device is operated on and optionally sent to at least one other node device. For example, the node device 106 that receives the command message 107 from the commander node (directly or via at least one other node device 106) can perform the action directed by the commander node. That same node device 106 also optionally can send the command message 107 to at least one other node device 106 in the mesh network 104. This can help ensure that more or all node devices 106 in the network 104 receive and perform the operation(s) dictated by the command message 107.

But, if the command message was not received by the node device 106 within the designated period of time at 302, then there may not be a commander node for the network 104. For example, the node device 106 previously operating as the commander node may have failed or not received the detection message. As a result, flow of the method 300 can proceed from 302 toward 306.

At 306, the node device is promoted to commander node. For example, the node devices 106 that receive the detection message 101 from the monitoring assembly 102, but that have not received a command message 107 from a commander node within a designated time slot or period of time can self-promote themselves to the role of the commander node for the network 104. This self-promotion of a node device 106 can occur by the promoted node device 106 sending a promotion signal or message in the network 104 to the other node devices 106.

This promotion message informs the other node devices 106 of the identity (e.g., network address or other uniquely identifying information) of the node device 106 that is promoted to commander node. For example, the node device 106 that self-promotes to the commander node can send one or more data packets in the network 104 to one or more (or all) other node devices 106 informing the other node devices 106 of the identity (e.g., network address) of the node device 106 that was promoted to commander node.

Because multiple node devices 106 may receive the detection message 101 from the monitoring assembly 102 but do not receive a command message 107 from a commander node within the designated time slot or period of time following receipt of the detection message 101, several node devices 106 may be self-promoted to the role of commander node for the network 104. The network 104 may allow only a single commander node to avoid the same command message 107 being implemented multiple times (e.g., due to one or more node devices 106 receiving the same command message 107 from multiple commander nodes in the network 104). To prevent several node devices 106 from being promoted to the role of commander node, the node devices 106 that are promoted to commander node examine the promotion message(s) received from other node devices 106.

At 308, a determination is made as to whether the node device that promoted itself to commander node at 306 has received a promotion message from any other node devices. In one embodiment, a first node device 106 that promoted itself to commander node at 306 can determine whether the first node device 106 has received another promotion message from a second (or third, fourth, etc.) node device 106 since the first node device 106 last received a command message or a detection message.

If the first node device 106 promoted to commander node has received a promotion message from another node device 106, then the first node device 106 can determine which of the promoted node devices 106 are to be the single commander node for the network 104. As a result, flow of the method 300 can proceed toward 310. But, if the first node device 106 promoted to commander node has not received a promotion message from another node device 106, then the first node device 106 may be the only commander node of the network 104. As a result, flow of the method 300 can proceed toward 304, described above.

At 310, the node device that was promoted to one of the multiple commander nodes compares identifying information of the commander nodes to determine whether the node device should resign as a commander node. In one embodiment, the self-promoting node devices 106 examine contents of the received promotion message(s) to determine which of the self-promoted node devices 106 is the one commander node of the network 104. As one example, the node device 106 can compare its network address with the network address(es) of other promoted node device(s) 106 to determine which node device 106 has the smallest network address (or the largest network address). The network addresses may have non-numeric digits or items removed to allow for comparison of the addresses. For example, a network address of 123.45.678.90 can be truncated to 1234567890.

Alternatively, the node devices 106 may be assigned priority values, such as one, two, three, and the like. The node device 106 can compare its priority value with the priority value of the other promoted node device(s) 106 to determine which node device 106 is to be the commander node. In another example, the node device 106 can compare other unique information assigned to the node devices 106 (such as serial numbers).

At 312, a determination is made as to whether the node device that self-promoted to commander node is to resign from the role of commander node. The node device 106 can compare identifying information of that node device 106 with identifying information in the promotion message received from one or more other node devices 106 that self-promoted to the commander node to determine whether to resign the commander node role. For example, the first node device 106 may have promoted itself to the role of commander node, and also received promotion messages from second and third node devices 106. The first node device 106 can compare the unique identifying information of the first node device 106 with the unique identifying information of the second and third node devices 106 to determine whether the first node device 106 is to remain as a commander node, or resign from that role. For example, if the first node device 106 has a numerically smaller network address than the network addresses in the promotion messages received from the other node devices 106, then the first node device 106 may remain as the commander node. As a result, flow of the method 300 can flow from 312 toward 304, described above. But, if the first node device 106 has a larger network address than the network addresses in the promotion messages received from the other node devices 106, then the first node device 106 may not remain as the commander node. As a result, flow of the method 300 can proceed from 312 toward 314.

At 314, the node device resigns the role of commander node. The node device 106 can send a resignation signal or message to one or more (or all) of the other node devices 106 in the network 104. This resignation message can inform the other node devices 106 that the node device 106 sending the resignation message is no longer a commander node. The method 300 can be performed by each of the node devices 106 that has been promoted to commander node. The method 300 results with only one node device 106 being the commander node upon completion of the method 300. For example, only the node device 106 having the lowest (or largest) network address, serial number, priority value, or the like, remains a commander node, while the other node devices 106 resign as commander node.

The identification of a single commander node for the network 104 can remain constant or may change several times. For example, depending on which node devices 106 receive a detection message 101, the node device 106 that is promoted to commander node for the network 104 may change several times (e.g., be different for different detection messages 101).

Upon completion of the method 300, the method 200 can proceed from the method 300 to 212 in the flowchart of the method 200, as shown in FIG. 2. Returning to the description of the method 200, the control message is sent to other node devices 106 at 212, such as by the node commander creating and sending the command message to one or more other node devices 106, and optionally those node devices 106 sending the same command message to one or more additional node devices 106.

At 214, a determination is made as to whether a node device that receives the command message is operably coupled with a controlled device. For example, the node device 106 that receives the command message determines if that node device 106 is connected with a lamp or other device to control operation of that lamp or other device. If the node device 106 that receives the command message is coupled with a controlled device, then flow of the method 200 can proceed toward 216. This determination can be repeated at several, or each, of the node devices 106 in the network 104. At 216, the node device that receives the command message changes operation of the controlled device according to the command message. The node device 106 can change the operation of the device being controlled by that node device 106, such as by turning off a lamp, turning on the lamp, changing a brightness of the light generated by the lamp, changing a color of the light generated by the lamp, or the like.

Alternatively, then node device 106 can change another operation of the lamp, or change the operation of another type of device based on the command message. For example, the node device 106 can activate or deactivate an alarm, activate or deactivate a camera or other type of sensor, change a temperature at a thermostat, start or end a timer, send a message using the device, or the like.

This can allow for a user that manually actuates the monitoring assembly 102 to remotely control a change in operation in the controlled devices via the node devices 106, without the monitoring assembly 102 having to be part of the network 104. This can permit the monitoring assembly 102 to be a passive device that is not continuously powered or that does not have continual access to a source of power for the monitoring assembly 102, while still being able to send a notification to the network 104 that the monitoring assembly 102 has been actuated. Alternatively, the monitoring assembly 102 can send the detection message 101 without user actuation of the monitoring assembly 102, such as by the monitoring assembly 102 automatically detecting an event (as described herein) and sending the detection message 101, which causes the commander node of the network 104 to send the command message 107 for controlling the node devices 106 to implement some action with the controlled devices.

But, if the node device 106 is not connected with a controlled device (e.g., the determination made at 214), then flow of the method 200 can proceed from 214 toward 202. For example, the node device 106 may not control another device, but may instead forward or otherwise send the command message 107 to one or more other node devices 106. Flow of the method 200 can return toward 202, or optionally terminate.

Figure 4:
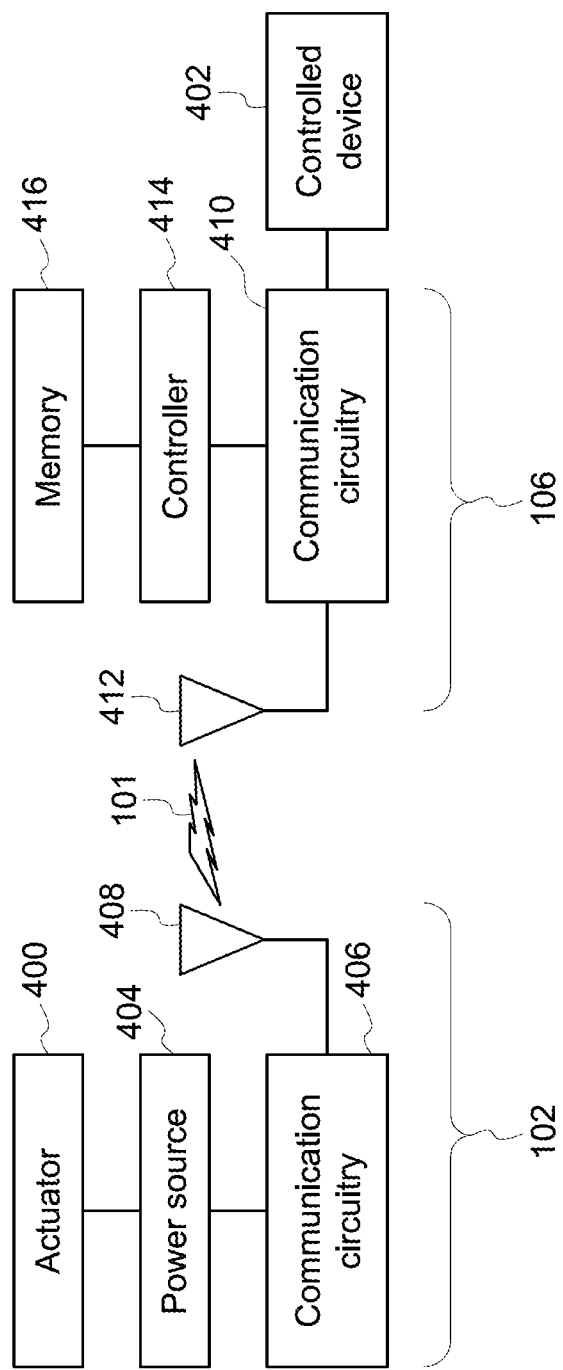
FIG. 4 illustrates details of one embodiment of each of the monitoring assembly shown in FIG. 1 and one of the node devices shown in FIG. 1.

FIG. 4 illustrates details of one embodiment of each of the monitoring assembly 102 and one of the node devices 106. The monitoring assembly 102 includes an actuator 400, such as a switch, lever, button, or the like. Movement of the actuator 400 can be an event that is detected by the monitoring assembly 102. The actuator 400 can be moved by a user of the monitoring assembly 102 to manually control operations of one or more controlled devices 402, as described above. Alternatively, the actuator 400 can be a sensor that detects the event. For example, the actuator 400 can instead be a motion sensor, a photodetector, or the like, that senses the event.

The monitoring assembly 102 also includes a power source 404 that provides energy to one or more other components of the monitoring assembly 102. In one embodiment, the power source 404 is an energy harvesting device that converts one form of ambient energy (not electric grid energy or any battery) into another form of energy (e.g., electric current) to power the monitoring assembly 102. For example, the power source 404 can convert movement of the actuator 400 (e.g., kinetic energy) into electric current. As another example, the power source 404 can include a photovoltaic device that converts ambient light into electric current. The power source 404 can include a thermoelectric generator that converts heat or thermal energy into electric current. As another example, the power source 404 can include a wind turbine (e.g., a micro wind turbine) that converts the kinetic energy of moving air into electric current. The power source 404 can include piezoelectric fibers or crystals that convert vibration into electric current. Alternatively, the power source 404 can include a connection to a utility power grid and/or can include one or more batteries.

The monitoring assembly 102 includes communication hardware, which can include communication circuitry 406 and optionally one or more antennas 408. The communication circuitry 406 can represent radio circuitry that can broadcast a radio signal via or using the antenna 408. For example, the communication circuitry 406 can detect movement of the actuator 400, form the detection message 101, and direct the antenna 408 to broadcast a radio signal that includes one or more packets representative of the detection message 101. Alternatively, the communication circuitry 406 can represent another type of wireless communication circuitry, such as one or more modems, transceivers, or the like, that form and send the detection message 101 as a broadcasted wireless signal.

The node device 106 includes communication hardware formed from communication circuitry 410 and one or more antennas 412. The antennas 412 can wirelessly receive the broadcast detection message 101, and optionally can communicate (e.g., send and/or receive) other signals or messages with other node devices 106, such as the promotion message, command message, and the like. The communication circuitry 410 can include radio circuitry, modems, routers, transceivers, or the like, that communicate with the monitoring assembly 102 and other node devices 106. Optionally, the communication circuitry 410 can communicate with other devices (e.g., other node devices 106) via wired connections.

The communication circuitry 410 can receive and communicate contents of received messages received to a controller 414 of the node device 106. The controller 414 represents hardware circuitry that includes and/or is connected with one or more processors (e.g., one or more integrated circuits, one or more field programmable gate arrays, and/or one or more microprocessors). The controller 414 examines the messages received by the node device 106 to determine how to proceed. The controller 414 can perform the operations described in connection with the flowcharts of the methods 200, 300 described above. For example, the controller 414 can determine whether a detection message 101 is received and whether a controller node has been identified. The controller 414 can determine whether the node device 106 that includes the controller 414 is to self-promote to the role of controller node. The controller 414 can determine whether a promotion message is received from another node device 106. The controller 414 can compare identifying information of the node device 106 with identifying information received from another node device 106 to determine which node device 106 is to remain the commander node or to resign from the role of commander node.

The controller 414 also can examine the contents of the command messages 107 received by the communication circuitry 410, and determine how to control the controlled device 402. For example, the controller 414 can examine the data contents of a command message 107 and determine that a lamp is to be turned off or on. The controller 414 can generate and send (e.g., via the communication circuitry 410) a control signal to the controlled device 402 that implements the change in operation dictated by the command message 107.

The node device 106 also can include a tangible and non-transitory computer readable storage medium, or memory, 416, that stores information for use by the controller 414. This memory 416 can be the internal memory of a processor of the controller 414, or can be a separate memory, such as a semiconductor memory. Alternatively, the memory 416 can be another type of medium that electronically stores information. The memory 416 can store the identifying information of the node device 106, details on the current state of the controlled device 402, an identification of a previously promoted controller node, or other information. The controller 414 can access the memory 416 to obtain the information needed for performance of the operations described in connection with the flowcharts of the methods 200, 300 described above.

Figure 5:
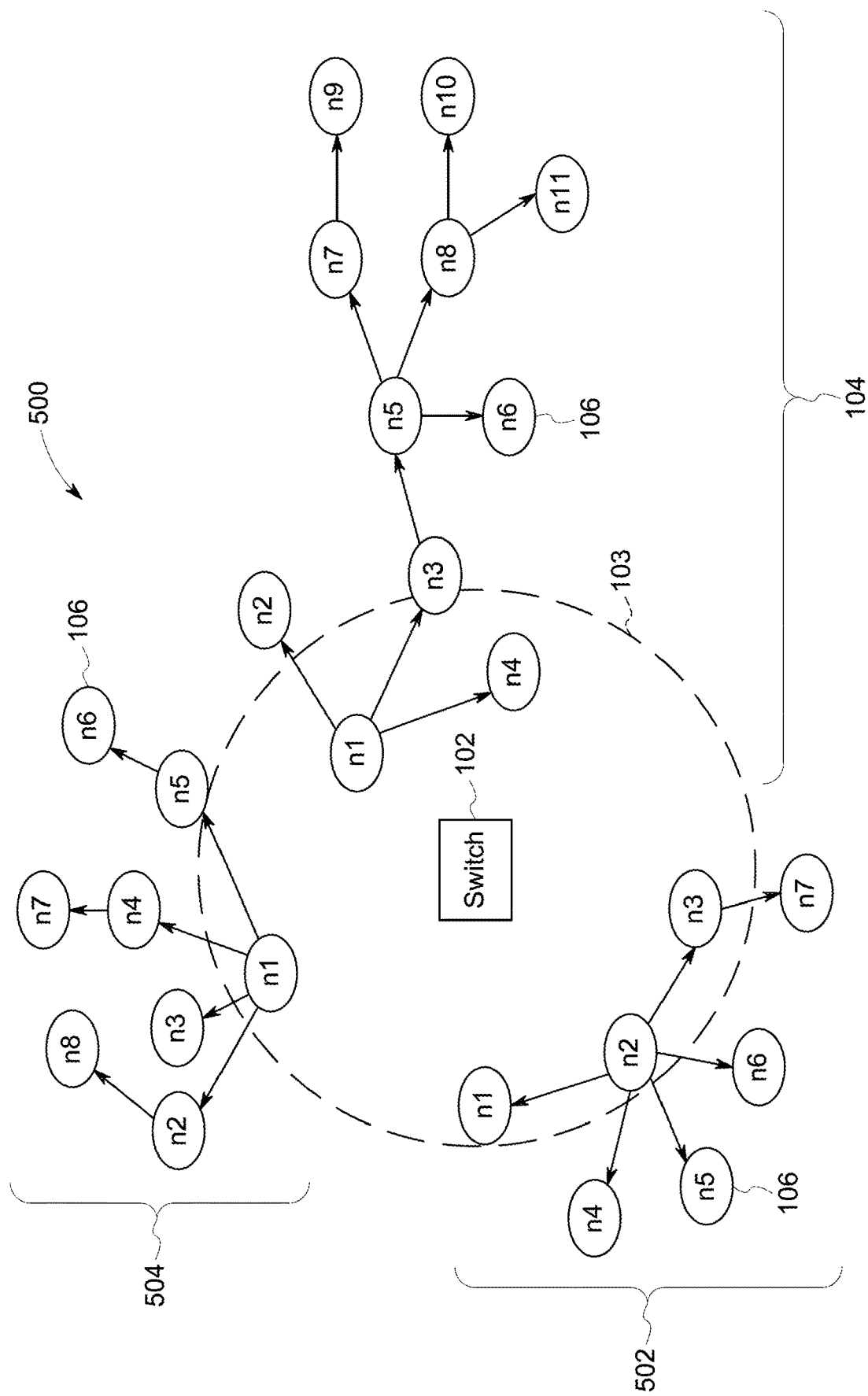
FIG. 5 illustrates another embodiment of a communication system.

While the foregoing description focuses on the monitoring assembly 102 communicating with one or more node devices 106 in a single network 104 (e.g., a single mesh network), alternatively, the monitoring assembly 102 can communicate with node devices 106 in multiple, separate networks. FIG. 5 illustrates another embodiment of a communication system 500. The communication system 500 is similar to the communication system 100 shown in FIG. 1 in that the communication system 500 includes the monitoring assembly 102 and the network 104 formed from several node devices 106. One difference between the communication systems 100, 500 is that the communication system 500 includes additional networks 502, 504 in communication with the monitoring assembly 102. Each of the networks 502, 504 can be formed from node devices 106 that are communicatively coupled with each other, as described in connection with the network 104. In one embodiment, one or more (or each) of the networks 104, 502, 504 is a mesh network.

The networks 104, 502, 504 can be separate networks such that no node device 106 in one network 104, 502, 504 is connected with or able to communicate with any node device 106 in any other network 104, 502, 504. The networks 104, 502, 504 can use different communication protocols and/or message formats so that the messages or signals sent by a node device 106 in one network 104, 502, 504 cannot be received or cannot be understood by a node device 106 in another network 104, 502, 504 without translating or modifying the message or signal. Alternatively, the networks 104, 502, 504 may communicate using the same communication protocol and the same message format so that the messages or signals sent by a node device 106 in one network 104, 502, 504 can be received and understood by a node device 106 in another network 104, 502, 504 without translating or modifying the message or signal.

The monitoring assembly 102 can broadcast the detection signal 101, as described above. One or more node devices 106 in two or more (or all) of the networks 104, 502, 504 may be within the range 103 of the monitoring assembly 102 such that these node devices 106 receive the detection signal 101 shown in FIG. 1. As shown in FIG. 5, the node devices n1 and n4 in the network 104 may be within the range 103 of the monitoring assembly 102 and receive the detection signal 101, the node devices n1, n2, n3 in the network 502 may be within the range 103 of the monitoring assembly 102 and receive the detection signal 101, and the node device n1 in the network 504 may be within the range 103 of the monitoring assembly 102 and receive the detection signal 101.

The node devices 106 in each of the networks 104, 502, 504 that receives the detection signal 101 can operate as described above to determine the commander node of the respective network 104, 502, 504, separately distribute a command signal 107 among the node devices 106 in the networks 104, 502, 504, and implement the action(s) dictated by the command signal 107, as described above. Because the networks 104, 502, 504 may not be able to communicate with each other, the node devices 106 in the separate networks 104, 502, 504 may separately examine the command signals 107 as described above. This can allow for a single monitoring assembly 102 that is not part of any network to concurrently or simultaneously communicate a command entered via the monitoring assembly 102 to the different networks for implementation in the controlled devices 402.

In one embodiment, the monitoring assembly 102 can detect different events and send different detection messages 101 representative of the different events. For example, the actuator 400 shown in FIG. 4 may include two or more of switches, levers, buttons, or the like. Actuating different ones of these devices can cause the monitoring assembly 102 to send different detection messages 101. For example, a first detection message 101 can be broadcast to one or multiple networks responsive to one of the actuators 400 being actuated, and cause a first operation to change with respect to the controlled devices 402 coupled with the node devices 106. A different, second detection message 101 can be broadcast to one or multiple networks responsive to a different, second actuator 400 being actuated, and cause a different, second operation to change with respect to the controlled devices 402 coupled with the node devices 106.

In one embodiment, a method includes detecting an event at a monitoring assembly, broadcasting a detection message from the monitoring assembly, receiving the detection message at two or more nodes in a network, arbitrating which of the two or more nodes in the network is a commander node among the two or more nodes in the network, and communicating the detection message or another message representative of the event from the commander node to other nodes in the network responsive to arbitrating which of the two or more nodes is the commander node.

Optionally, the method also can include implementing one or more responsive actions based on receipt of the detection message or another message at the other nodes in the network.

Optionally, the event that is detected at the monitoring assembly is one or more of actuation of a switch, movement of an object, or a change in a light level at the monitoring assembly.

Optionally, the detection message is wirelessly broadcasted from the monitoring assembly.

Optionally, the detection message is wirelessly broadcasted in a message format that differs from a message format used for communication among the nodes in the network.

Optionally, the detection message is wirelessly broadcasted from the monitoring assembly as a radio signal.

Optionally, arbitrating which of the two or more nodes in the network is the commander node includes comparing identifying information associated with each of the two or more nodes to determine which of the two or more nodes is the commander node.

Optionally, the identifying information that is compared is a network address that is unique to each of the two or more nodes.

Optionally, the monitoring assembly is not included in the network and is not able to communicate between the nodes in the network.

Optionally, the monitoring assembly is powered by harvesting kinetic energy from the event that is detected at the monitoring assembly.

In one embodiment, a system includes a monitoring assembly configured to detect an event within a monitored area of the device. The monitoring assembly is configured to broadcast a detection message toward a network. The system also includes two or more nodes of the network configured to receive the detection message and to arbitrate which of the two or more nodes in the network is a commander node among the two or more nodes in the network. The commander node is configured to communicate the detection message or another message representative of the event to other nodes in the network responsive to arbitrating which of the two or more nodes is the commander node.

Optionally, at least one of the nodes in the network is configured to implement one or more responsive actions based on receipt of the detection message or another message.

Optionally, the monitoring assembly is configured to one or more of: detect actuation of a switch as the event, detect movement as the event, or detect a change in a light level as the event.

Optionally, the monitoring assembly is configured to wirelessly broadcast the detection message as a radio signal.

Optionally, the two or more nodes are configured to arbitrate which of the two or more nodes in the network is the commander node by comparing identifying information associated with each of the two or more nodes.

Optionally, the two or more nodes are configured to arbitrate and determine which of the nodes is the commander mode and to communicate the detection message or another message from the commander node by changing which of the two or more nodes is the commander node for different detection messages broadcast from the detection device.

Optionally, the two or more nodes are two or more first nodes, the network is a first network, and the commander node is a first commander node. The system also can include two or more second nodes of a second network that is separate from and communicatively decoupled from the first network. The two or more second nodes also can be configured to receive the detection message from the monitoring assembly. The two or more second nodes can be configured to arbitrate which of the two or more second nodes in the second network is a second commander node among the two or more second nodes in the second network. The second commander node can be configured to communicate the detection message or another message representative of the event to other nodes in the second network responsive to determining which of the two or more second nodes is the second commander node.

Optionally, the event that is detected at the monitoring assembly is a first event, the two or more nodes are two or more first nodes, the network is a first network, the commander node is a first commander node, and the detection message is a first detection message. The monitoring assembly can be configured to detect a different, second event and to broadcast a second detection message. The system also can include two or more second nodes of a second network that are configured to receive the second detection message and to arbitrate which of the two or more second nodes in the second network is a second commander node in the second network. The second commander node can be configured to communicate the second detection message or another message representative of the second event to other nodes in the second network responsive to arbitrating which of the two or more second nodes is the second commander node.

Optionally, the two or more first nodes in the first network communicate using a different communication protocol than the two or more second nodes in the second network such that the two or more first nodes cannot communicate with the two or more second nodes.

In one embodiment, a lighting control system includes a monitoring assembly comprising a switch, an energy harvesting device, and radio circuitry. The switch is configured to be manually actuated to activate or deactivate one or more network-controlled lamps. The energy harvesting device is configured to convert kinetic energy of the manual actuation of the switch into electric energy that powers the radio circuitry. The radio circuitry is configured to wirelessly broadcast a radio control message. The system also includes two or more networked controllers configured to control activation or deactivation of the one or more network-controlled lamps. The two or more networked controllers are configured to wirelessly receive the radio control message from the monitoring assembly. The two or more networked controllers also are configured to communicate with each other and determine which of the two or more networked controllers is designated as a commander controller responsive to receiving the radio control message. The commander controller is configured to communicate the radio control message or another control message to one or more other networked controllers to activate or deactivate the one or more network-controlled lamps based on the radio control message received from the monitoring assembly.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
detecting an event at a monitoring assembly;
broadcasting a detection message from the monitoring assembly using a first communication protocol;
receiving the detection message at two or more nodes, the two or more nodes in a network formed using a second communication protocol different from the first communication protocol, wherein the network is a mesh network and the monitoring assembly is outside of the mesh network;
arbitrating which of the two or more nodes in the network is a commander node among the two or more nodes in the network; and
communicating the detection message or another message representative of the event from the commander node to other nodes in the network responsive to arbitrating which of the two or more nodes is the commander node;
wherein the detection message is wirelessly broadcasted in a message format that differs from a message format used for communication among the nodes in the network.

2. The method of claim 1, further comprising implementing one or more responsive actions based on receipt of the detection message or another message at the other nodes in the network.

3. The method of claim 1, wherein the event that is detected at the monitoring assembly is one or more of actuation of a switch, movement of an object, or a change in a light level at the monitoring assembly.

4. The method of claim 1, wherein the detection message is wirelessly broadcasted from the monitoring assembly.

5. The method of claim 1, wherein the detection message is wirelessly broadcasted from the monitoring assembly as a radio signal.

6. The method of claim 1, wherein arbitrating which of the two or more nodes in the network is the commander node includes comparing identifying information associated with each of the two or more nodes to determine which of the two or more nodes is the commander node.

7. The method of claim 6, wherein the identifying information that is compared is a network address that is unique to each of the two or more nodes.

8. The method of claim 1, wherein the monitoring assembly is not included in the network and is not able to communicate between the nodes in the network.

9. The method of claim 1, wherein the monitoring assembly is powered by harvesting kinetic energy from the event that is detected at the monitoring assembly.

10. A system comprising:
a monitoring assembly configured to detect an event within a monitored area of the monitoring assembly, the monitoring assembly configured to broadcast a detection message toward a mesh network using a first communication protocol, wherein the monitoring assembly is not in the mesh network; and
two or more nodes of the mesh network configured to receive the detection message and to arbitrate which of the two or more nodes in the mesh network is a commander node among the two or more nodes in the mesh network, the commander node configured to communicate the detection message or another message representative of the event to other nodes in the mesh network responsive to arbitrating which of the two or more nodes is the commander node, wherein communication within the mesh network uses a communication protocol different from the first communication protocol.

11. The system of claim 10, wherein at least one of the nodes in the mesh network is configured to implement one or more responsive actions based on receipt of the detection message or another message.

12. The system of claim 10, wherein the monitoring assembly is configured to one or more of: detect actuation of a switch as the event, detect movement as the event, or detect a change in a light level as the event.

13. The system of claim 10, wherein the monitoring assembly is configured to wirelessly broadcast the detection message as a radio signal.

14. The system of claim 10, wherein the two or more nodes are configured to arbitrate which of the two or more nodes in the mesh network is the commander node by comparing identifying information associated with each of the two or more nodes.

15. The system of claim 10, wherein the two or more nodes are configured to arbitrate and determine which of the nodes is the commander mode and to communicate the detection message or another message from the commander node by changing which of the two or more nodes is the commander node for different detection messages broadcast from the detection device.

16. The system of claim 10, wherein the two or more nodes are two or more first nodes, the mesh network is a first network, and the commander node is a first commander node, and further comprising:
two or more second nodes of a second network that is separate from and communicatively decoupled from the first network, the two or more second nodes also configured to receive the detection message from the monitoring assembly, the two or more second nodes are configured to arbitrate which of the two or more second nodes in the second network is a second commander node among the two or more second nodes in the second network, the second commander node configured to communicate the detection message or another message representative of the event to other nodes in the second network responsive to determining which of the two or more second nodes is the second commander node.

17. The system of claim 10, wherein the event that is detected at the monitoring assembly is a first event, the two or more nodes are two or more first nodes, the mesh network is a first network, the commander node is a first commander node, and the detection message is a first detection message,
wherein the monitoring assembly is configured to detect a different, second event and to broadcast a second detection message, and further comprising:
two or more second nodes of a second network, the two or more second nodes configured to receive the second detection message and to arbitrate which of the two or more second nodes in the second network is a second commander node in the second network, wherein the second commander node is configured to communicate the second detection message or another message representative of the second event to other nodes in the second network responsive to arbitrating which of the two or more second nodes is the second commander node.

18. The system of claim 17, wherein the two or more first nodes in the first network communicate using a different communication protocol than the two or more second nodes in the second network such that the two or more first nodes cannot communicate with the two or more second nodes.

19. A lighting control system comprising:
a monitoring assembly comprising a switch, an energy harvesting device, and radio circuitry, the switch configured to be manually actuated to activate or deactivate one or more network-controlled lamps, the energy harvesting device configured to convert kinetic energy of the manual actuation of the switch into electric energy that powers the radio circuitry, the radio circuitry configured to wirelessly broadcast a radio control message using a first communication protocol; and
two or more networked controllers in a mesh network formed using a second communication protocol and configured to control activation or deactivation of the one or more network-controlled lamps, the two or more networked controllers configured to wirelessly receive the radio control message from the monitoring assembly, the two or more networked controllers configured to communicate with each other and determine which of the two or more networked controllers is designated as a commander controller responsive to receiving the radio control message,
wherein the commander controller is configured to communicate the radio control message or another control message to one or more other networked controllers to activate or deactivate the one or more network-controlled lamps based on the radio control message received from the monitoring assembly;
wherein the monitoring assembly is not in the mesh network of the networked controllers.

20. A system comprising:
a monitoring assembly configured to detect an event within a monitored area of the monitoring assembly, the monitoring assembly configured to broadcast a detection message toward a first network, wherein the monitoring assembly is not in the first network;
two or more first nodes of a first network configured to receive the detection message and to arbitrate which of the two or more first nodes in the first network is a first commander node among the two or more first nodes in the first network, the first commander node configured to communicate the detection message or another message representative of the event to other first nodes in the first network responsive to arbitrating which of the two or more first nodes is the first commander node;
two or more second nodes of a second network that is separate from and communicatively decoupled from the first network, the two or more second nodes also configured to receive the detection message from the monitoring assembly, the two or more second nodes are configured to arbitrate which of the two or more second nodes in the second network is a second commander node among the two or more second nodes in the second network, the second commander node configured to communicate the detection message or another message representative of the event to other nodes in the second network responsive to determining which of the two or more second nodes is the second commander node.

21. A system comprising:
a monitoring assembly configured to detect a first event within a monitored area of the monitoring assembly, the monitoring assembly configured to broadcast a first detection message toward a first network, and further to detect a different, second event and to broadcast a second detection message, wherein the monitoring assembly is not in the first network;

two or more first nodes of a first network configured to receive the first detection message and to arbitrate which of the two or more first nodes in the first network is a first commander node among the two or more first nodes in the first network, the first commander node configured to communicate the first detection message or another message representative of the first event to other first nodes in the first network responsive to arbitrating which of the two or more first nodes is the first commander node; and two or more second nodes of a second network, the two or more second nodes configured to receive the second detection message and to arbitrate which of the two or more second nodes in the second network is a second commander node in the second network, wherein the second commander node is configured to communicate the second detection message or another message representative of the second event to other nodes in the second network responsive to arbitrating which of the two or more second nodes is the second commander node.

22. The system of claim 21, wherein the two or more first nodes in the first network communicate using a different communication protocol than the two or more second nodes in the second network such that the two or more first nodes cannot communicate with the two or more second nodes.

\* \* \* \* \*